Jan. 8, 1929.                                                1,698,640
R. M. LOVEJOY
SHOCK ABSORBER
Filed Nov. 22, 1926
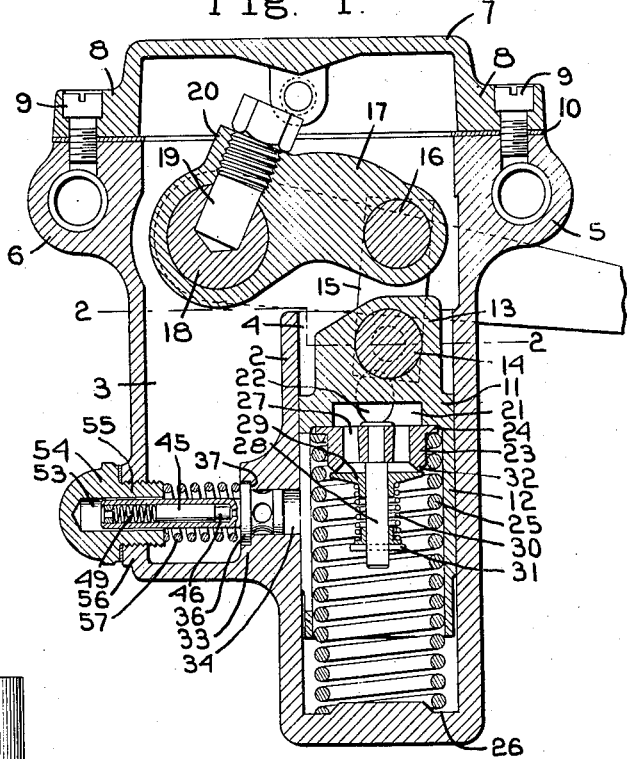
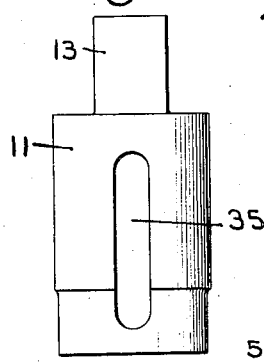
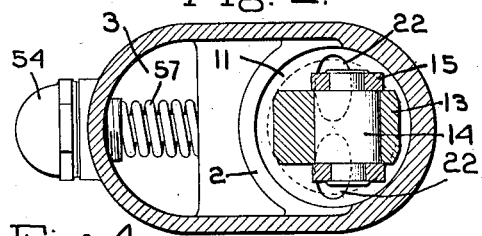
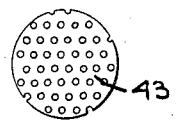
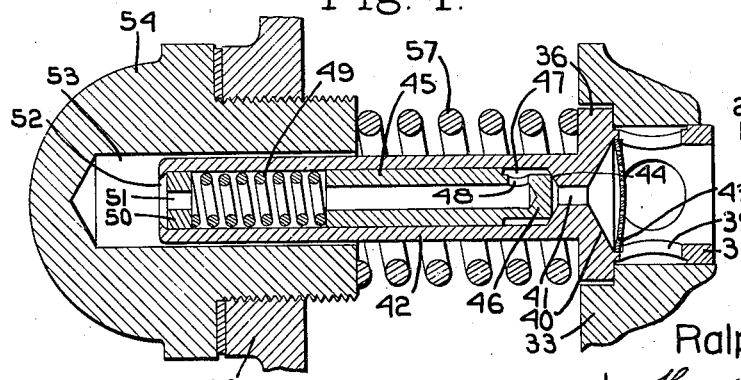
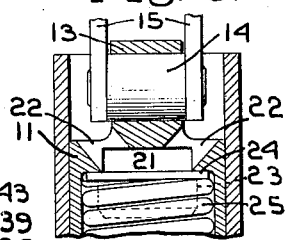
Inventor
Ralph M. Lovejoy
by Heard Smith & Tennant
Attys.

Patented Jan. 8, 1929.

1,698,640

UNITED STATES PATENT OFFICE.

RALPH M. LOVEJOY, OF BOSTON, MASSACHUSETTS.

SHOCK ABSORBER.

Application field November 22, 1926. Serial No. 149,859.

This invention relates to improvements in hydraulic shock absorbers and the general object thereof is to provide an instrument which will operate more effectively to absorb both light and heavy shocks. The invention relates more particularly to the type of hydraulic shock absorber which is disclosed in my prior Patent No. 1,324,913 granted December 16, 1919, which comprises a casing having a reservoir and a cylinder provided with a valved inlet communicating with said reservoir adapted to permit a substantially free flow of liquid from the reservoir into the cylinder and to prevent the flow of the liquid from the cylinder to the reservoir, a piston reciprocable in said cylinder and a relief port having a spring actuated valve adapted to permit a restricted flow of liquid from the cylinder to the reservoir in response to compressive movements of the piston.

It has been found in the operation of such shock absorbers that if the spring for the relief valve is of sufficient strength properly to restrict the flow of liquid from the cylinder in response to heavy shocks which cause an extended and rapid movement of the piston it will not yield sufficiently to absorb properly slight shocks such as are caused when a vehicle, equipped with such shock absorbers, is passing over a cobbled pavement, or a slightly rough road surface. On the other hand, if the relief valve spring is sufficiently light to be properly responsive to relatively slight movements of the piston it will not offer sufficient resistance to the full and rapid movements of the piston caused by major shocks.

The object, therefore, of the present invention is to provide relief valve mechanism of greater flexibility which will respond properly to slight movements of the piston and will also afford proper resistance to the pressure in the cylinder caused by the greater movements thereof.

More particularly the object of the invention is to provide the relief port with a compound relief valve construction comprising a main valve for resisting the flow of liquid caused by the greater movements of the piston and an auxiliary valve responsive to relatively slight movements of the piston.

A further object of the invention is to provide a compound relief valve of the character specified with a port of restricted area adapted to impose a resistance to the flow of liquid upon the relatively slight movements of the piston with a co-operating valve under the influence of a relatively light spring.

A further object of the invention is to provide means for preventing the clogging of the relatively small auxiliary valve port.

A further object of the invention is to provide a simplified shock absorber construction in which the relief port is located substantially midway of the length of the cylinder thus producing a more economical shock absorber construction by the saving of considerable metal and also providing a smaller, but sufficient reservoir for the liquid.

Other objects and features of the invention will more fully appear from the following description and the accompanying drawings and will be particuarly pointed out in the claims.

In the drawings:

Fig. 1 is a vertical longitudinal sectional view of a shock absorber embodying the invention;

Fig. 2 is a transverse sectional view on line 2—2 Fig. 1 looking downward;

Fig. 3 is a perspective view of the tubular piston illustrating the slot therein which communicates with the relief port;

Fig. 4 is an enlarged vertical sectional view of the compound relief valve and illustrating the manner in which the same is mounted in the relief port and casing;

Fig. 5 is a fragmentary view, mainly in longitudinal vertical section, through the cylinder and the tubular piston; and, Fig. 6 is a detail view of the screen or filter for preventing the clogging of the restricted port in the relief valve.

The shock absorber illustrated in Fig. 1 comprises a casing 1 having an interior cylindrical wall 2 dividing the chamber of the casing into a reservoir 3 and a cylinder 4. The casing desirably is provided with ears 5 and 6 having apertures to receive bolts by means of which the casing may be secured to one of two relatively movable members, such as the frame of a vehicle. The casing is provided with a cover 7 having laterally extending ears 8 which are secured by suitable machine screws 9 to the ears 5 and 6 of the casing, a gasket 10 being interposed between the ears of the cover and casing to provide a liquid-tight structure.

The piston, which is reciprocably mounted in the casing, comprises a head 11 and a skirt 12 extending therefrom a substantial portion of the length of the cylinder. The head of the piston is provided with an upwardly extending, preferably rectangular, boss 13 having a transverse bearing therethrough to receive a pintle or shaft 14 which is connected by links 15 to a similar pintle or shaft 16 in the end portion of an arm 17 which is rigidly secured to a rock shaft 18 by a pin 19 which enters said rock shaft and is provided with a screw threaded section 20 which engages complementary walls in said arm. The rock shaft 18, which is journalled in suitable bearings provided with oil-tight glands in the casing, extends through the casing and its outer end is rigidly connected to an arm which in turn is connected by a flexible connection to the other relatively movable member, such as the axle of the vehicle, as is well known to those skilled in the art.

The under face of the piston head 11 is provided with a countersink or recess 21 and is also provided with apertures 22 which desirably extend obliquely upwardly from said recess and communicate with the upper portion of the cylinder which is in communication with the reservoir, thus providing an inlet from the reservoir to the cylinder beneath the piston head.

This inlet to the cylinder is provided with a suitable valve adapted to permit a substantially free flow of the liquid from the reservoir into the cylinder, but to prevent flow of the liquid in the reverse direction. In the preferred form illustrated herein the valve mechanism comprises an annular valve cage 23 provided with a peripheral flange 24 which rests upon a suitable seat on the lower face of the piston head. The valve cage is held in seated position by a helical spring 25 which is interposed between the flange 24 of the valve cage and the head 26 of the cylinder. The valve cage desirably is in the form of a spider 27 having a central stud 28 secured thereto upon which a valve 29 is slidably mounted and retained normally in engagement therewith by a light helical spring 30 the upper end of which engages the valve 29 and the lower end of which rests upon a pin 31 extending through the valve stem 28. Desirably the valve 29 presents a flat face and the valve cage 23 is provided with an annular valve seat in the form of a sharp edge 32 formed by bevelling the walls of the valve seat, thereby producing a substantially line engagement with the flat surface of the valve which will avoid the likelihood of sticking, thus insuring the freedom of movement of the valve during the intake stroke of the piston and permitting a substantially free flow of the liquid from the reservoir therethrough into the cylinder.

The inner wall 2 of the casing, which divides the reservoir from the cylinder, desirably is provided with a thickened portion 33 having therein a cylindrical relief port 34 which is controlled by a spring actuated relief valve. This relief port desirably is located approximately midway of the length of the cylinder and may be positioned closely adjacent to the bottom of the reservoir. By virtue of this arrangement a much smaller reservoir for the excess of liquid required may be employed and considerable saving made in the amount of material required to form the shock absorber casing.

The cylindrical skirt of the piston is provided with an aperture 35 which communicates with the relief port 34 and desirably is of such length as to maintain constant communication with said port during the full reciprocation of the piston. This aperture may be in the form of a slot, as illustrated in Fig. 3, or may be a series of apertures in such proximity as to permit a substantially continuous flow of the liquid from the cylinder through the port when sufficient pressure is imposed upon the liquid in the cylinder to unseat the relief valve or valves.

The shock absorber so far described is similar in principle to the commercial shock absorbers of the type above described. In the operation of shock absorbers of this type as applied to an automobile, or other vehicle, the compression of the springs of the vehicle, resulting from obstructions or depressions of the surface of the road, reduces the tension upon the outer arm of the shock absorber, thus permitting the helical spring 25 to raise the piston within the cylinder. As the piston is thus raised liquid flows from the reservoir through the inlet port 22, unseating the valve 29 and entering the cylinder beneath the valve. Upon rebounding movement of the spring the outside arm is moved in the opposite direction, forcing downwardly the inside arm 17, and the piston, thus exerting a compressive force upon the liquid which is in the cylinder. As the inlet valve 29 is then closed such resistance to the descent of the piston is offered as is controlled by the resistance of the relief valve to the flow of the liquid through the port 34. In previous constructions the amount of resistance to the descent of the piston has been determined by the strength of the spring of the relief valve and, as heretofore stated, it has been practically impossible to provide a spring of such strength as will effectively resist the pressure of the liquid during long and rapid movements of the piston, and also provide a sufficiently less resistance to permit the instrument to respond properly to shocks which produce relatively short movements of the piston.

The principal object of the invention, therefore, is to provide a compound valve construction which will produce the required resistance to the flow of liquid through the relief port under all conditions of reciprocation of the piston. This is accomplished by providing a compound valve mechanism comprising a main valve having a spring of sufficient strength to cause the valve to offer sufficient resistance to the flow of liquid through the relief port to cushion the major shocks and an auxiliary valve controlled by a relatively light spring adapted to be displaced in response to light shocks, such as are obtained when the vehicle is passing over a cobbled surface or the like.

The preferred construction of the relief valve is illustrated in Fig. 1 and in enlarged detail in Fig. 4. This valve construction comprises a tubular valve having a head 36 which engages an annular valve seat 37 in the enlarged portion 33 of the wall 2 and a cylindrical portion 38 slidably fitting the walls of the relief port 34. The cylindrical portion of the tubular valve is provided with one or more apertures 39 through which liquid may flow from the relief port to the reservoir when the valve is forced from its seat. The head of the valve is provided with a desirably conoidal inner face 40 converging to a central port 41 which communicates with a tubular valve stem 42 which desirably is integral with the head 36 of the valve. The valve port 42 is of relatively small area and, therefore, permits a restricted flow of liquid therethrough. Desirably a screen 43 is located within the cylindrical section of the tubular valve and serves to prevent foreign material from clogging the restricted valve port 41. This screen desirably is of sheet metal comprising a sheet, having very small perforations, stamped into convex form and after insertion at the base of the cylindrical section of the tubular valve expanded into a suitable annular recess therein.

The stem 42 of the valve is of cylindrical form and is provided at its outer end with a closure presenting a restricted opening. The end of the tubular valve stem adjacent the cylinder desirably is provided with a conoidal wall 44 which may conform to the end of a drill employed to bore the chamber in the valve stem, this wall forming the seat for an auxiliary valve. The preferred form of auxiliary valve illustrated herein comprises a cylindrical plunger 45 which slidably fits in the tubular valve stem and has a solid imperforate, preferably flat, end 46, the periphery of which is adapted to engage the valve seat 44. The wall of this end portion of the hollow valve is reduced to provide a recess or chamber 47 and an aperture 48 is provided in the reduced wall communicating with the chamber of the valve. The valve is held normally in seated position by a helical spring 49 which abuts at one end against the outer end of the hollow valve and at its other end against a suitable abutment which is rigidly secured in the valve stem. Preferably the outer end of the valve stem is provided with a restricted outlet for the liquid which is forced through the valve stem. A convenient construction, which is illustrated herein, comprises a plug or collar 50, having a central restricted aperture 51 of suitable diameter, which is secured in the outer end of the valve stem by the swaged or spun-over end portion 52 of the valve stem.

The valve stem desirably extends into a cylindrical chamber 53 in a plug 54, having a screw threaded stem 55 which enters and engages the screw threaded wall of an aperture in a boss 56 of the casing. The chamber 53 is of slightly larger diameter than the diameter of the valve stem so that the liquid, which is forced into the chamber, will build up a pressure upon the end of the valve stem which is complementary to the pressure imposed by the piston upon the liquid in the cylinder during its compressive movement. A helical spring 57, surrounding the valve stem 42 and abutting at one end against the inner end of the plug 52 and at its other end against the head 36 of the main valve, serves to urge the main valve toward seated position.

By reason of this construction the auxiliary valve is yieldable to the pressure imposed by the piston upon the liquid in the cylinder caused by slight shocks, while the restricted area of the auxiliary valve port 40 is too small to permit a sufficiently rapid descent of the piston in response to the heavier shocks, so that sufficient pressure will be built up within the cylinder to unseat the main valve and permit the liquid to be discharged from the relief port directly into the reservoir. This flow, however, is restricted by the valve sufficiently to check gradually the descent of the piston and thus absorb a major shock.

The flow of the liquid through the auxiliary valve port 41 first displaces the auxiliary valve from its seat and then flows through the chamber 47 and aperture 48 into the chamber of the valve 45 and from this chamber through the restricted aperture 51 into the chamber 53 in the plug. Inasmuch as the valve stem is provided with but little clearance from the wall of the chamber in the plug, pressure is accumulated in the chamber 53, when the pressure in the cylinder is greatly increased, which acts upon the end of the valve stem and thereby tends to force the valve toward its seat in addition to the force of the main valve spring 57. Thus the resistance of the main valve to displacement is correlated in a measure to the pressure imposed by the piston upon the liquid in the cylinder when the piston is given relatively great and rapid movements which impose a heavy pressure upon the liquid in the cylinder. On the other hand relatively slight movements of the piston are resisted mainly or wholly by the restricted valve port 41 and the spring actuated auxiliary valve 45 and such further resistance as may be imposed upon the liquid by the restricted passage 51 in the outer end of the valve stem and the passage between the outer surface of the valve stem and the wall of the chamber in the plug. By reason of this construction means are provided by which suitable resistance to the movement of the piston is obtained to absorb both heavy and light shocks and a much greater flexibility of action is attained than in previous instruments of the type above described.

It may be mentioned that by causing the liquid to pass from the restricted valve port 41 through the chamber 53 in the plug and thence into the reservoir bubbling or foaming of the liquid in the reservoir is avoided which would occur if ports were provided in the wall of the valve stem to discharge the oil therefrom directly into the reservoir.

It will be understood that the embodiment of the invention disclosed herein is of an illustrative character and is not restrictive and that various changes in form, construction and arrangement of parts may be made within the spirit and scope of the following claims.

Having thus described the invention, what is claimed as new, and desired to be secured by Letters Patent, is:

1. A shock absorber comprising a reservoir, a cylinder having a piston reciprocable therein, means permitting the flow of liquid from said reservoir to said cylinder beneath said piston, but preventing flow in the opposite direction, a relief port leading from said cylinder to said reservoir, a compound valve mechanism for said relief port comprising a main valve fitting said relief port and provided itself with a port of small area adapted to restrict the flow of liquid therethrough, a hollow auxiliary main valve for said valve port provided with a reduced end portion having a lateral port communicating with the chamber of said auxiliary valve and springs for said auxiliary and main valves yieldable respectively to light and relatively heavy pressures of the liquid in said cylinder caused by the compressive movements of the piston.

2. A shock absorber comprising a reservoir, a cylinder having a piston reciprocable therein, means permitting the flow of liquid from said reservoir to said cylinder beneath said piston, but preventing flow in the opposite direction, a relief port leading from said cylinder to said reservoir, a compound valve mechanism for said relief port comprising a main valve fitting said relief port having itself a port of small area adapted to restrict the flow of liquid therethrough, a tubular valve stem on said main valve communicating at one end with said valve port and provided at its opposite end with a restricted outlet, a hollow auxiliary valve slidably mounted in said valve stem provided with a reduced end portion having a lateral port communicating with the chamber of said hollow auxiliary valve, a light spring acting normally to seat said auxiliary valve and a relatively heavy spring normally acting to seat said main valve.

3. A shock absorber comprising a reservoir, a cylinder having a piston reciprocable therein, means permitting the flow of liquid from said reservoir to said cylinder beneath said piston, but preventing flow in the opposite direction, a relief port leading from said cylinder to said reservoir, a compound valve mechanism for said relief valve comprising a main valve fitting said relief port having itself a port of small area adapted to restrict the flow of liquid therethrough, a tubular valve stem on said main valve communicating at one end with said valve port and provided at its other end with a restricted outlet, a hollow valve slidably fitting said valve stem having a reduced end portion and presenting a flat face to close said port and an aperture through the wall of said reduced portion communicating with the chamber of said valve stem, a light spring tending to seat said auxiliary valve, means for restricting the flow of liquid from said valve stem to said reservoir and a relatively heavy spring tending to seat said main valve.

4. A shock absorber comprising a reservoir, a cylinder having a piston reciprocable therein, means permitting the flow of liquid from said reservoir to said cylinder beneath said piston, but preventing flow in the opposite direction, a relief port leading from said cylinder to said reservoir, a compound valve mechanism for said relief port comprising a main valve fitting said relief port having itself a central port of small area adapted to restrict the flow of liquid therethrough, a tubular valve stem on said main valve communicating at one end with said valve seat and provided at its other end with a wall having a restricted outlet of substantially the same area as said valve port, an auxiliary valve slidably mounted in said tubular valve stem, a light spring tending to seat said auxiliary valve, a relatively heavy spring tending to close said main valve and a chamber enclosing the end of said valve stem having a restricted communication with said reservoir acting to cause building up of pressure upon the end of the valve stem which will supplement the action of the heavy spring in correlation to the increase in the pressure in said cylinder.

5. A shock absorber comprising a reservoir, a cylinder having a piston reciprocable therein, means permitting the flow of liquid from said reservoir to said cylinder beneath said piston, but preventing flow in the opposite direction, a relief port leading from said cylinder to said reservoir, a compound valve mechanism for said relief port comprising a tubular main valve slidably fitting said relief port provided with a lateral outlet and a central port of small area and having a tapered outer wall, a tubular valve stem on said valve communicating at one end with said valve port, a chambered cylindrical auxiliary valve slidably fitting in said valve seat having a reduced end portion presenting a flat face to engage said tapered valve seat, and having an aperture in the wall of said reduced end portion communicating with the chamber of said auxiliary valve to permit the liquid, upon the opening of the valve, to flow through its chamber into the valve stem, a light spring tending to seat said auxiliary valve and a relatively heavy spring tending to seat said main valve.

6. A shock absorber comprising a reservoir, a cylinder having a piston reciprocable therein, means permitting the flow of liquid from said reservoir to said cylinder beneath said piston, but preventing flow in the opposite direction, a relief port leading from said cylinder to said reservoir, a compound valve mechanism for said relief port comprising a tubular main valve slidably fitting said relief port provided with a lateral outlet and with a central port of small area and having a tubular valve stem provided with a restricted port at a distance from said valve, a screen within said tubular valve seat of greater area than said valve port acting to prevent clogging of said valve port, an auxiliary valve for said valve port and light and heavy springs tending respectively to seat said auxiliary and main valves.

7. A shock absorber comprising a casing having an interior wall dividing the chamber thereof into a reservoir and a cylinder, a tubular piston reciprocable in said cylinder having in its head a port, a spring actuated inlet valve acting to permit free flow of liquid from the reservoir into the cylinder and an aperture in the skirt of said piston, a relief port communicating with said cylinder through said aperture substantially midway of the length of the cylinder and a compound valve mechanism for said relief port including an auxiliary and a main valve yieldable respectively to light and relatively heavy pressures of the liquid in said cylinder caused by the compressive movements of the piston.

In testimony whereof, I have signed my name to this specification.

RALPH M. LOVEJOY.